United States Patent [19]

Kim

[11] Patent Number: 5,274,481
[45] Date of Patent: Dec. 28, 1993

[54] POLYMER DISPERSED LIQUID CRYSTAL DEVICE HAVING PARTITIONS BETWEEN DIFFERENT COLORS FORMED BY ETCH-PRINTING

[75] Inventor: Si H. Kim, Seoul, Rep. of Korea

[73] Assignee: Samsung Electon Devices Co. Ltd., Kyungki-Do, Rep. of Korea

[21] Appl. No.: 845,241

[22] Filed: Mar. 3, 1992

[30] Foreign Application Priority Data

Jun. 14, 1991 [KR] Rep. of Korea .............. 91-9786

[51] Int. Cl.$^5$ ............... G02F 1/13; G02F 1/1335
[52] U.S. Cl. ........................... 359/51; 359/62; 359/98
[58] Field of Search ............ 359/53, 51, 52, 68, 359/98, 62

[56] References Cited

U.S. PATENT DOCUMENTS 5,015,074  5/1991  Clerc et al. ................... 359/68
5,018,840  5/1991  Ogawa ........................ 359/51

FOREIGN PATENT DOCUMENTS 58-117523   7/1983  Japan ........................ 359/68
61-194425   8/1986  Japan ........................ 359/68
62-087937   4/1987  Japan ........................ 359/68
1-255832   10/1989  Japan ........................ 359/51
3-119315    5/1991  Japan ........................ 359/62

Primary Examiner—William L. Sikes
Assistant Examiner—Ron Trice
Attorney, Agent, or Firm—Ladas & Parry

[57] ABSTRACT

A plane display apparatus in which R, G and B liquid crystal cells are isolated from each other by means of partition walls, and a pair of ITO electrodes are formed on each of the cells and between a pair of substrates, wherein the cells can be arranged either in a matrix form or in a linear form and each pair of the ITO electrodes is supplied with a single voltage, the liquid crystal cells having different driving characteristics respectively.

8 Claims, 2 Drawing Sheets

FIG. 1
PRIOR ART
FIG. 2A
PRIOR ART
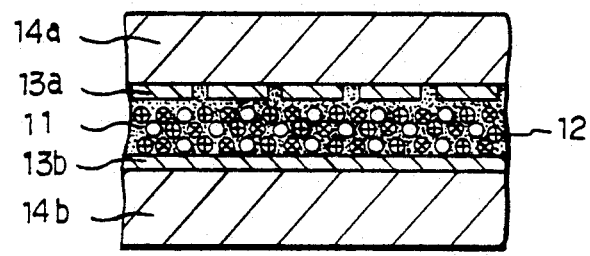
FIG. 2B
PRIOR ART
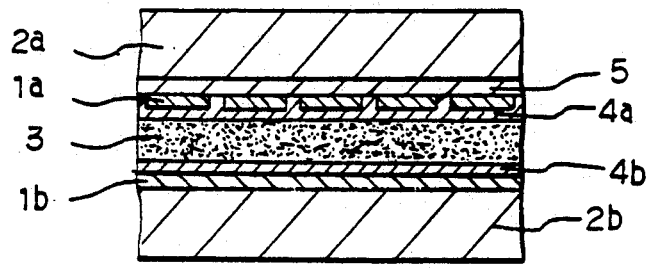
FIG. 2C
PRIOR ART
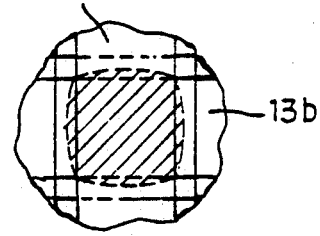
FIG. 3A
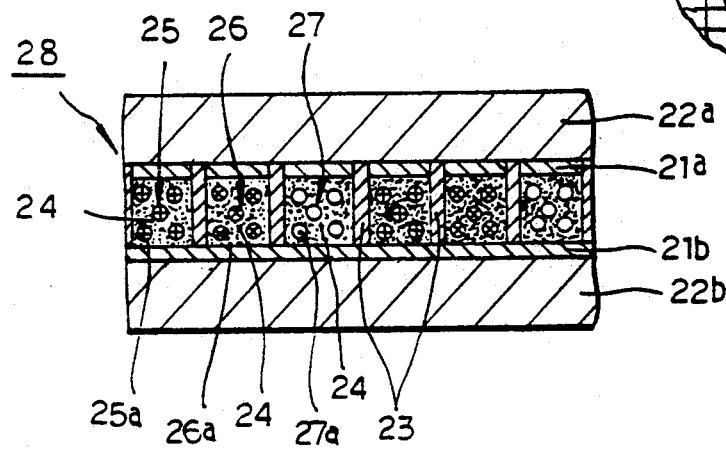

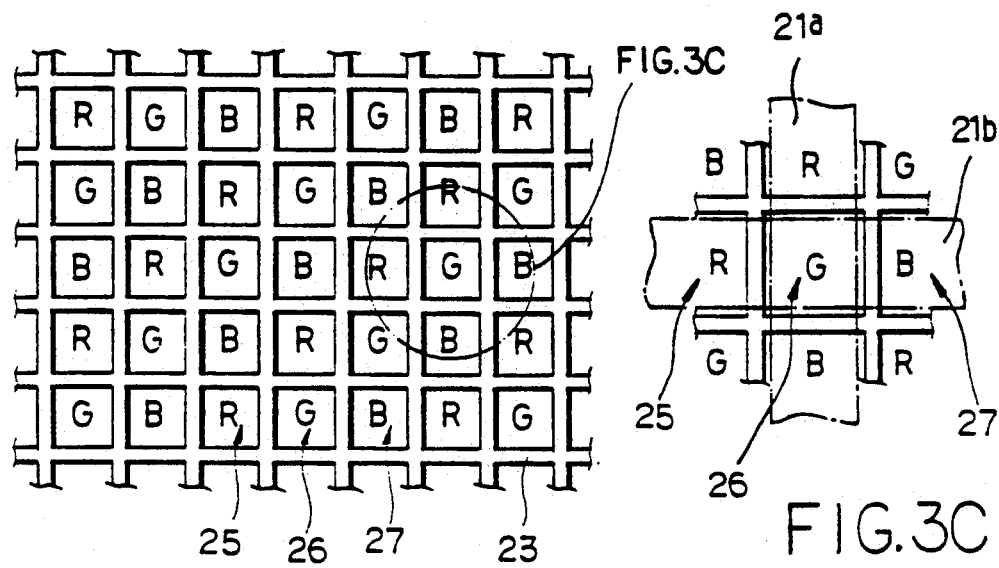
FIG. 3B
FIG. 3C
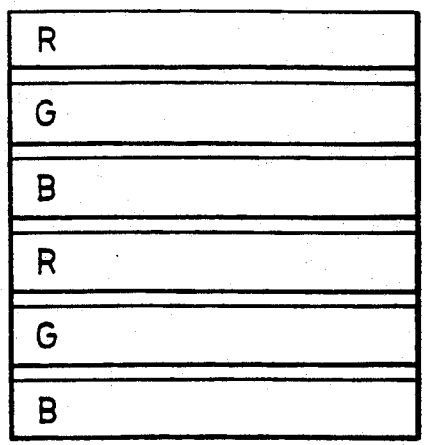
FIG. 4
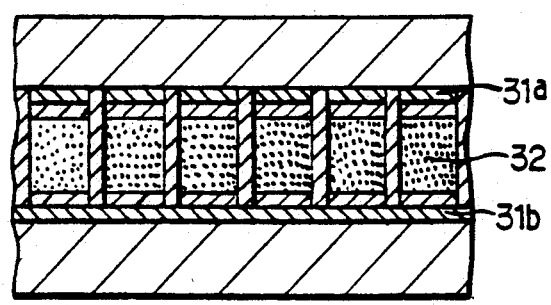
FIG. 5

POLYMER DISPERSED LIQUID CRYSTAL DEVICE HAVING PARTITIONS BETWEEN DIFFERENT COLORS FORMED BY ETCH-PRINTING

FIELD OF THE INVENTION

The present invention relates to a display apparatus, and more particularly to, a plane display apparatus in which liquid crystal cells formed by separate red, green and blue (R, G and B) colored liquid crystals are used in order to improve the picture characteristics.

BACKGROUND OF THE INVENTION

As shown in FIG. 1, a conventional plane display apparatus based on a STN (super twist nematic) method is constituted in such a manner that a liquid crystal 3 is filled between substrates 2a and 2b provided with ITO electrodes 1a, 1b thereon and oriented films 4a and 4b are formed between the ITO electrodes 1a,1b and the liquid crystal 3.

Further, in the case of a color display apparatus, a color filter 5 is formed between the ITO electrode 1a and the substrate 2a.

In such a display apparatus based on the STN method, if a certain level of voltage is supplied between the two ITO electrodes 1a, 1b and the liquid crystal 3 disposed between the two electrodes 1a and 1b are driven in order for the liquid crystal 3 to be oriented in a certain direction by the oriented films 4a and 4b, the color of the color filter 5 at the portion of the ITO electrodes 1a and 1b on which the voltage is supplied displayed after the passing-through of light rays.

However, in such a display apparatus based on the STN method, the color filter 5 is formed between the substrate 2a and the ITO electrode 1a, and the oriented films 4a and 4b are formed between the ITO electrodes 1a,1b and the liquid crystal 3 as described above.

Therefore, the processes for forming the color filter 5 and the oriented films 4a and 4b have to be added, thereby complicating the process.

In an attempt to overcome the above described disadvantages, a display apparatus based on a PDLC (Polymer Dispersed Liquid Crystal) method as shown in FIG. 2 has been developed, and according to this method, liquid crystals dyed with red, green and blue (R, G and B) colors are used, so that the process should be simplified.

That is, a macro polymer 11 and liquid crystals 12 which are respectively dyed with R, G and B colors are physically mixed together so as to form a uniform mixture so that ultraviolet rays are irradiated on the mixture.

Then, the polymer 11 undergoes a polymerization so as to be solidified, while the liquid crystals 12 of the R, G and B colors are maintained in the original state. Under this condition, the existence of the R, G and B liquid crystals 12 in the form of small drops within the polymer 11 is utilized, and this arrangement is disposed between substrates 14a and 14b on which ITO electrodes 13a and 13b are formed.

In such a display apparatus based on the PDLC method, when no voltage is supplied to the two ITO electrodes 13a and 13b, the small drops of the liquid crystals 12 take random directions, and therefore, light rays can not pass through due to a dispersion phenomenon. On the other hand, if a certain level of voltage is supplied to the ITO electrodes 13a and 13b, the small drops of the liquid crystals 12 are oriented in the direction of the applied voltage, so that light rays can pass through.

However, the R, G and B liquid crystals 12 are uniformly mixed within the polymer 11 without segregation, and therefore, it is difficult to obtain the respective color characteristics of the crystals. Further, in driving the R, G and B liquid crystals 12 respectively, the voltage and its frequency supplied to the ITO electrodes 13a and 13b have to be different depending on the respective colors, and therefore, the arrangement of the circuit for driving the liquid crystals becomes very complicated, as well as requires an expensive IC for developing the circuit.

Further, as shown in FIG. 2B, the voltage is supplied to the ITO electrodes 13a and 13b which are crossing each other, and therefore, not only are the mutually crossing electrodes 13a and 13b influenced by the applied voltage, but also the adjacent regions as well. As a result, the adjacent regions are driven together and a color dispersion phenomenon occurs, thereby deteriorating the color characteristics.

SUMMARY OF THE INVENTION

An object of the present invention is to provide a plane display apparatus, in which the R, G and B liquid crystals are filled in respective cells provided with the liquid crystals of different drive characteristics being mutually isolated disposed in isolation, the thereby allowing the circuit to be simplified by supplying a voltage of a single frequency to each pair of ITO electrodes, the driven liquid crystals and the non-driven liquid crystals being mutually isolated so as to prevent any interference between them, thereby preventing color dispersion, and improving the color characteristics.

In achieving the above object, the apparatus according to the present invention is constituted in such a manner that the R, G and B liquid crystals mixed within the solidified polymer are mutually isolated in the form of liquid crystal cells, the cells are isolated by partitions, and ITO electrodes are installed on them and upon substrates.

BRIEF DESCRIPTION OF THE DRAWINGS

The above object and other advantages of the present invention will become more apparent by describing in detail the preferred embodiment of the present invention with reference to the attached drawings, in which:

FIG. 1 is a sectional view of the conventional display apparatus based on an STN method;

FIG. 2A is a sectional view of the conventional display apparatus based on a PDLC method;

FIG. 2B illustrates the driving of the display apparatus of FIG. 2A;

FIG. 2C is an enlarged detail of FIG. 2B;

FIG. 3A is a sectional view of the liquid crystal arrangement according to the present invention;

FIG. 3B is a view of liquid crystal arrangement of the display apparatus according to the present invention;

FIG. 3C is an enlarged detail of FIG. 3B;

FIG. 4 illustrates another embodiment of the liquid crystal arrangement according to the present invention; and FIG. 5 is a sectional view of another embodiment of the display apparatus according to the present invention.

DESCRIPTION OF THE PREFERRED EMBODIMENT

FIGS. 3A and 3B illustrate an embodiment of a plane display apparatus according to the present invention. As shown in FIGS. 3A and 3B, partition walls 23 are formed between two substrates 22a and 22b provided with ITO electrodes 21a and 21b being formed on the substrates 22a and 22b. Liquid crystal cells 25-27 which are filled with uni-color liquid crystals 25a-27a in the form of small drops within solidified polymers 24 are isolated by the partition walls 23, while the cells are arranged in the order of R, G and B colors to form a matrix.

The liquid crystal cells 25-27 are arranged in such a manner that the liquid crystals having different driving characteristics are disposed adjacent to each other. For example, if the G color liquid crystal has a characteristic of being driven by a high frequency and low voltage, then the B color liquid crystal disposed adjacent to the G color liquid crystal consists of a liquid crystal to be driven by a low frequency and high voltage.

The plane display apparatus constructed as above can be manufactured by a process described below.

That is, the ITO electrode 21b is formed on the substrate 22b; an insulating layer is coated on the ITO electrode 21b, and then, the partition walls 23 are formed by an etching (masking) printing process.

Then, the R color liquid crystal 25a and the polymer 24 are spread on the partition wall 23 in a uniformly mixed form and a printing process is employed to etch off the undesired portions and to leave only the required portions, so that the R color liquid crystal cells 25 are formed between the partition walls 23 corresponding to the required portions. Then, the polymer 24 is irradiated with ultraviolet rays so that the polymer 24 is solidified and small drops of the R color liquid crystal 25a are formed in the solidified polymer 24.

When forming the liquid crystal cells 25-27, if the quantity of the liquid crystals 25a-27a is too small or if the property of the polymer 24 is unsuitable, the drops of the liquid crystals are not formed within the polymer and remain in the form of a network within the polymer.

Meanwhile, the G and B color liquid crystals 26a,27a are also formed into the liquid crystal cells 26 and 27 on the required portions in the same way as that of the R color liquid crystal 25a, and the R, G and B color liquid crystal cells 25-27 are sequentially arranged, so that a matrix is formed and the adjacent cells are different in their driving characteristics.

Thus, if the R, g and B color liquid crystal cells 25-27 are formed, and if the other substrate 22a with the ITO electrodes 21a formed thereon is assembled, the plane display apparatus according to the present invention is formed.

Meanwhile, it can easily be understood that, besides the matrix form, the R, G and B color liquid crystals can be arranged in a linear form as shown in FIG. 4.

In the apparatus of the present invention as described above, when a voltage is not supplied to the ITO electrodes 21a and 21b as shown in FIGS. 3A and 3B, the drops of the liquid crystals 25a-27a have random directions, and therefore, light rays can not pass through due to the dispersion phenomenon. On the other hand, if a voltage is supplied to the ITO electrodes 21a and 21b, the drops of the liquid crystals 25a-27a are oriented in the direction of the applied voltage, thereby allowing the light rays to pass therethrough. Further, each of the liquid crystal cells 25-27 consists of a single color, and the adjacent cells have different driving characteristics such as high frequency low voltage and low frequency high voltage.

Consequently, a constant voltage is applied all the time to the ITO electrodes 21a and 21b for driving the respective liquid crystal cells 25-27.

For example, as shown in FIGS. 3A and 3B, it will be assumed that the G color liquid crystal cell 26 is driven by the high frequency low voltage and that the high frequency low voltage is supplied to the opposite ITO electrodes 21a and 21b. Then, only the G color liquid crystal cell 26 being disposed on the crossing lines of the opposite ITO electrodes 21a and 21b is driven and the adjacent R and B color cells 25 and 27 can also be driven by applying higher or lower adjusted voltage. Therefore, if a predetermined color cell is to be driven, the required level of voltage has only to be supplied to the opposite ITO electrodes 21a and 21b of the particular cell.

Therefore, the adjacent cells are not affected when driving a particular cell, so that the color is not spread. Further, a single voltage is supplied to each pair of the ITO electrodes 21a and 21b, and therefore, the construction of the circuit becomes simple, with the result that the need for the use of an expensive IC is eliminated, so as to save the manufacturing cost.

Further, the present invention can also be applied to a matrix form of the plane display apparatus as shown in FIG. 5, and therefore, no color dispersion occurs in cells 32 around the portion of the ITO electrodes 31a and 31b where the voltage is supplied, with the result that color dispersion is prevented, thereby improving the picture quality.

According to the present invention as described above, liquid crystal cells consisting respectively of single color R, G and B crystals are provided, and the cells are isolated by the partition walls, with the cells being arranged in the order of R, G and B colors.

Further, adjacent liquid crystal cells have different driving characteristics, thereby preventing color dispersions.

Further, each pair of the ITO electrodes is supplied with a single voltage suitable for each of the R, G and B colors in driving the respective liquid crystal cells, so that the arrangement of the circuit becomes simple and the use of an expensive IC can be avoided, thereby making it possible to reduce the manufacturing cost.

What is claimed is:

1. A method of producing a plane display device comprising:
   providing a first substrate with a first electrode therein,
   forming an array of electrically insulative partition walls on said electrode by etch-printing, said array of partition walls forming cells isolated from one another,
   applying a polymer containing red, green or blue colored liquid crystals, uniformly distributed therein, onto said substrate to fill all of said cells,
   fixing the polymer in selected cells and removing the polymer from the remaining cells by etch-printing,
   successively repeating the applying, fixing and removing of polymer containing each of the other colored liquid crystals to form a resulting arrangement in which each cell contains liquid crystal of one respective color and horizontally or vertically adjacent cells contain different colored liquid crystals, and assembling a second electrode and a second substrate on said cells opposite said first electrode.

2. A method as claimed in claim 1, comprising arranging the cells in a common plane in a matrix form with successive rows of repeating orders of red, green and blue colored liquid crystals.

3. A method as claimed in claim 1, comprising arranging the cells in a common plane in the form of stripes of successively repeating orders of red, green and blue colored liquid crystals.

4. A plane display apparatus comprising:
a first substrate,
a first electrode covering said first substrate,
an etch-printed partition of electrically insulative material forming an array of cells with insulating partition walls bounding each cell,
three etch-printed liquid crystal compositions, each containing respective, individual red, green or blue colored liquid crystals, said liquid crystal compositions being disposed in said cells in an arrangement in which horizontally or vertically adjacent cells contain different colored liquid crystals,
a second electrode on said cells opposite said first electrode, and
a second substrate on said second electrode.

5. A plane display apparatus as claimed in claim 4, wherein said cells are arranged in a common plane in the form of a matrix with successive rows of repeating orders of red, green and blue colored liquid crystals.

6. A plane display apparatus as claimed in claim 4, wherein said cells are arranged in a common plane in the form of stripes of successively repeating orders of red, green and blue colored liquid crystals.

7. A plane display apparatus as claimed in claim 4, wherein said cells with liquid compositions of red, green and blue colored liquid crystals have different respective driving characteristics so that energization of said electrodes with one of the driving characteristics will drive all of the corresponding cells containing said one of the colored liquid crystals while the other cells will not be driven.

8. A plane display apparatus as claimed in claim 4, wherein said electrodes are in direct contact with the liquid crystal compositions in said cells without intervening color filters.

* * * * *